(12) United States Patent
Konishi et al.

(10) Patent No.: US 10,845,801 B2
(45) Date of Patent: Nov. 24, 2020

(54) VEHICLE TRAVEL CONTROL APPARATUS

(71) Applicant: Honda Motor Co., Ltd., Tokyo (JP)

(72) Inventors: Yoshiaki Konishi, Wako (JP);
Takayuki Kishi, Wako (JP); Akira Kito, Wako (JP); Toshiyuki Mizuno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 157 days.

(21) Appl. No.: 16/245,200

(22) Filed: Jan. 10, 2019

(65) Prior Publication Data

US 2019/0220007 A1 Jul. 18, 2019

(30) Foreign Application Priority Data

Jan. 15, 2018 (JP) ................. 2018-004382

(51) Int. Cl.
*G05D 1/00* (2006.01)
*B60W 10/04* (2006.01)
(Continued)

(52) U.S. Cl.
CPC .......... *G05D 1/0061* (2013.01); *B60W 10/04* (2013.01); *B60W 10/18* (2013.01); *B60W 10/20* (2013.01); *B60W 30/09* (2013.01); *B60W 50/00* (2013.01); *G05D 1/0088* (2013.01); *B60W 2050/0071* (2013.01); *B60W 2520/10* (2013.01); *B60W 2554/00* (2020.02); *B60W 2710/18* (2013.01);
(Continued)

(58) Field of Classification Search
CPC .............. G05D 1/0061; G05D 1/0088; G05D 2201/0213; G05D 1/00; B60W 10/04; B60W 10/18; B60W 10/20; B60W 30/09; B60W 50/00; B60W 2554/00; B60W 2720/106; B60W 2050/0071; B60W 2520/10; B60W 2710/18; B60W 2710/20; B60W 2050/0096; B60W 30/182; B60W 40/105
USPC .............. 701/1, 23, 24, 25, 36, 41, 70, 103; 180/167; 340/438, 576
See application file for complete search history.

(56) References Cited

U.S. PATENT DOCUMENTS 6,836,719 B2 * 12/2004 Andersson ......... B60K 31/0058
701/93
10,501,078 B2 * 12/2019 Kishi .................... B60W 10/20
(Continued)

FOREIGN PATENT DOCUMENTS

JP 2016088334 A 5/2016

*Primary Examiner* — Shardul D Patel
(74) *Attorney, Agent, or Firm* — Duft & Bornsen, PC

(57) ABSTRACT

A vehicle travel control apparatus including a drive mode instruction switch instructing a manual drive mode or a self-drive mode and a processor configured to perform determining whether a deviation between a vehicle speed detected by a vehicle speed detector and a target vehicle speed included in an action plan is equal to or less than a predetermined value, and controlling an actuator in the self-drive mode in accordance with the action plan. The microprocessor is further configured to perform switching to the self-drive mode when switching to the self-drive mode is instructed during an acceleration running in the manual drive mode, and controlling the actuator so as to maintain an acceleration in the manual drive mode at least until it is determined that the deviation is equal to or less than the predetermined value.

14 Claims, 7 Drawing Sheets

(51) Int. Cl.
*B60W 10/18* (2012.01)
*B60W 10/20* (2006.01)
*B60W 30/09* (2012.01)
*B60W 50/00* (2006.01)

(52) U.S. Cl.
CPC ... *B60W 2710/20* (2013.01); *B60W 2720/106* (2013.01); *G05D 2201/0213* (2013.01)

(56) References Cited

U.S. PATENT DOCUMENTS

| | | | |
|---|---|---|---|
| 10,654,487 B2 * | 5/2020 | Kishi | B60W 50/08 |
| 2016/0209843 A1 * | 7/2016 | Meuleau | G01C 21/3407 |
| 2016/0311431 A1 * | 10/2016 | Kato | B60W 30/0956 |
| 2017/0192431 A1 * | 7/2017 | Foster | G05D 1/0088 |
| 2017/0235311 A1 * | 8/2017 | Sekijima | B60W 50/14 |
| | | | 701/25 |
| 2018/0148036 A1 * | 5/2018 | Gaither | B60W 30/1882 |
| 2018/0188734 A1 * | 7/2018 | Zhu | B60W 30/095 |
| 2019/0135280 A1 * | 5/2019 | Kishi | B60W 30/162 |
| 2019/0220008 A1 * | 7/2019 | Mizuno | B60W 40/09 |

\* cited by examiner

VEHICLE TRAVEL CONTROL APPARATUS

CROSS-REFERENCE TO RELATED APPLICATION

This application is based upon and claims the benefit of priority from Japanese Patent Application No. 2018-004382 filed on Jan. 15, 2018, the content of which is incorporated herein by reference.

BACKGROUND OF THE INVENTION

Field of the Invention

This invention relates to a vehicle travel control apparatus configured to switch a drive mode to a self-drive mode or a manual mode.

Description of the Related Art

Conventionally, an apparatus of this type is known that determines whether vehicle condition and surrounding environment are suitable for autonomous driving, allows switching from manual drive mode to autonomous drive mode (self-drive mode) when determined to be suitable, and prohibits switching from manual drive mode to autonomous drive mode when determined to be unsuitable. An apparatus of this type is described in Japanese Unexamined Patent Publication No. 2016-088334 (JP2016-088334A), for example.

Requiring attention in this connection is that vehicle propulsion force differing from that in manual drive mode is sometimes required in autonomous drive mode. Therefore, when manual drive mode is switched to autonomous drive mode, passengers (including driver) experience a considerably odd sensation because the vehicle propulsion force they expect is not exhibited.

SUMMARY OF THE INVENTION

An aspect of the present invention is a vehicle travel control apparatus configured to control an actuator for driving a vehicle, including: a drive mode instruction switch configured to instruct a manual drive mode or a self-drive mode; a vehicle speed detector configured to detect a vehicle speed; and an electric control unit having a microprocessor and a memory. The microprocessor is configured to perform: generating an action plan in the self-drive mode; determining whether a deviation between the vehicle speed detected by the vehicle speed detector and a target vehicle speed included in the action plan generated in the generating is equal to or less than a predetermined value; switching a drive mode in accordance with an instruction of the drive mode instruction switch; controlling the actuator in the self-drive mode in accordance with the action plan generated in the generating; the switching including switching from the manual drive mode to the self-drive mode, when an switching from the manual drive mode to the self-drive mode is instructed by the drive mode instruction switch during an acceleration running or deceleration running in the manual drive mode; and the controlling including controlling the actuator so as to maintain an acceleration in the manual drive mode at least until it is determined in the determining that the deviation is equal to or less than the predetermined value, when the switching from the manual drive mode to the self-drive mode is instructed by the drive mode instruction switch during the acceleration running or deceleration running in the manual drive mode.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
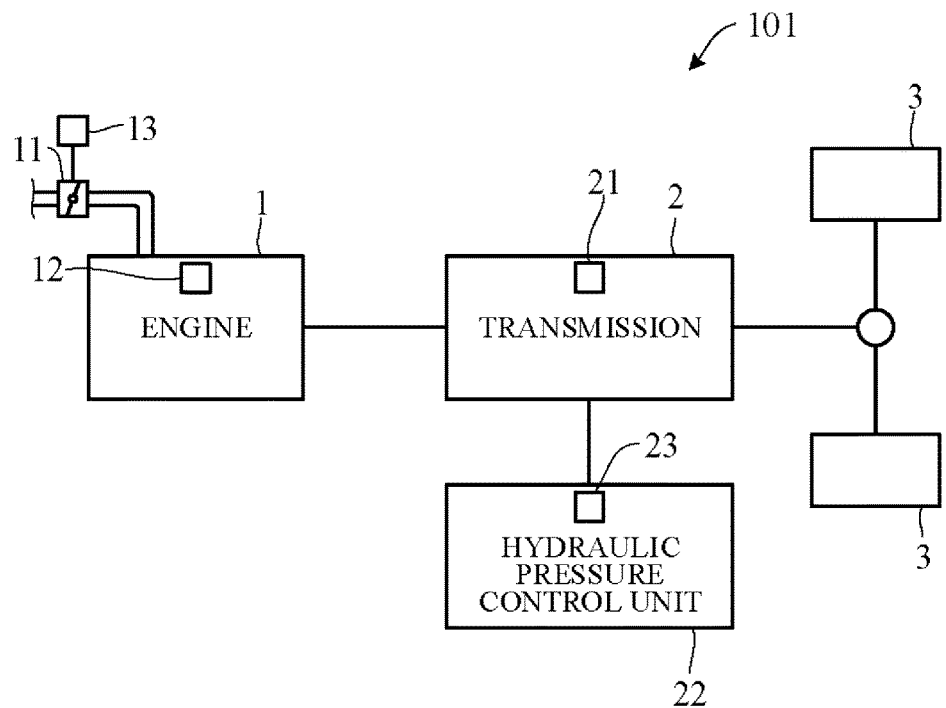
FIG. 1 is a diagram showing a configuration overview of a driving system of a self-driving vehicle to which a vehicle travel control apparatus according to an embodiment of the present invention is applied.

Hereinafter, an embodiment of the present invention is explained with reference to FIGS. 1 to 9. A vehicle travel control apparatus according to an embodiment of the present invention is applied to a vehicle (self-driving vehicle) having a self-driving capability. FIG. 1 is a diagram showing a configuration overview of a driving system of a self-driving vehicle 101 incorporating a travel control apparatus according to the present embodiment. Herein, the self-driving vehicle may be sometimes called subject vehicle to differentiate it from other vehicles. The vehicle 101 is not limited to driving in a self-drive mode requiring no driver driving operations but is also capable of driving in a manual drive mode by driver operations.

As shown in FIG. 1, the vehicle 101 includes an engine 1 and a transmission 2. The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Air intake volume is metered by the throttle valve. An opening angle of the throttle valve 11 (throttle opening angle) is changed by a throttle actuator 13 operated by an electric signal. The opening angle of the throttle valve 11 and an amount of fuel injected from the injector 12 (injection timing and injection time) are controlled by a controller 40 (FIG. 2).

The transmission 2, which is installed in a power transmission path between the engine 1 and drive wheels 3, varies speed ratio of rotation of from the engine 1, and converts and outputs torque from the engine 1. The rotation of speed converted by the transmission 2 is transmitted to the drive wheels 3, thereby propelling the vehicle 101. Optionally, the vehicle 101 can be configured as an electric vehicle or hybrid vehicle by providing a drive motor as a drive power source in place of or in addition to the engine 1.

The transmission 2 is, for example, a stepped transmission enabling stepwise speed ratio (gear ratio) shifting in accordance with multiple (e.g. six) speed stages. Optionally, a continuously variable transmission enabling stepless speed ratio shifting can be used as the transmission 2. Although omitted in the drawings, power from the engine 1 can be input to the transmission 2 through a torque converter. The transmission 2 can, for example, incorporate a dog clutch, friction clutch or other engaging element 21. A hydraulic pressure control unit 22 can shift speed stage of the transmission 2 by controlling flow of oil to the engaging element 21. The hydraulic pressure control unit 22 includes a solenoid valve or other valve mechanism operated by electric signals (called "shift actuator 23" for sake of convenience), and an appropriate speed stage can be implemented by changing flow of hydraulic pressure to the engaging element 21 in response to operation of the shift actuator 23.

Figure 2:
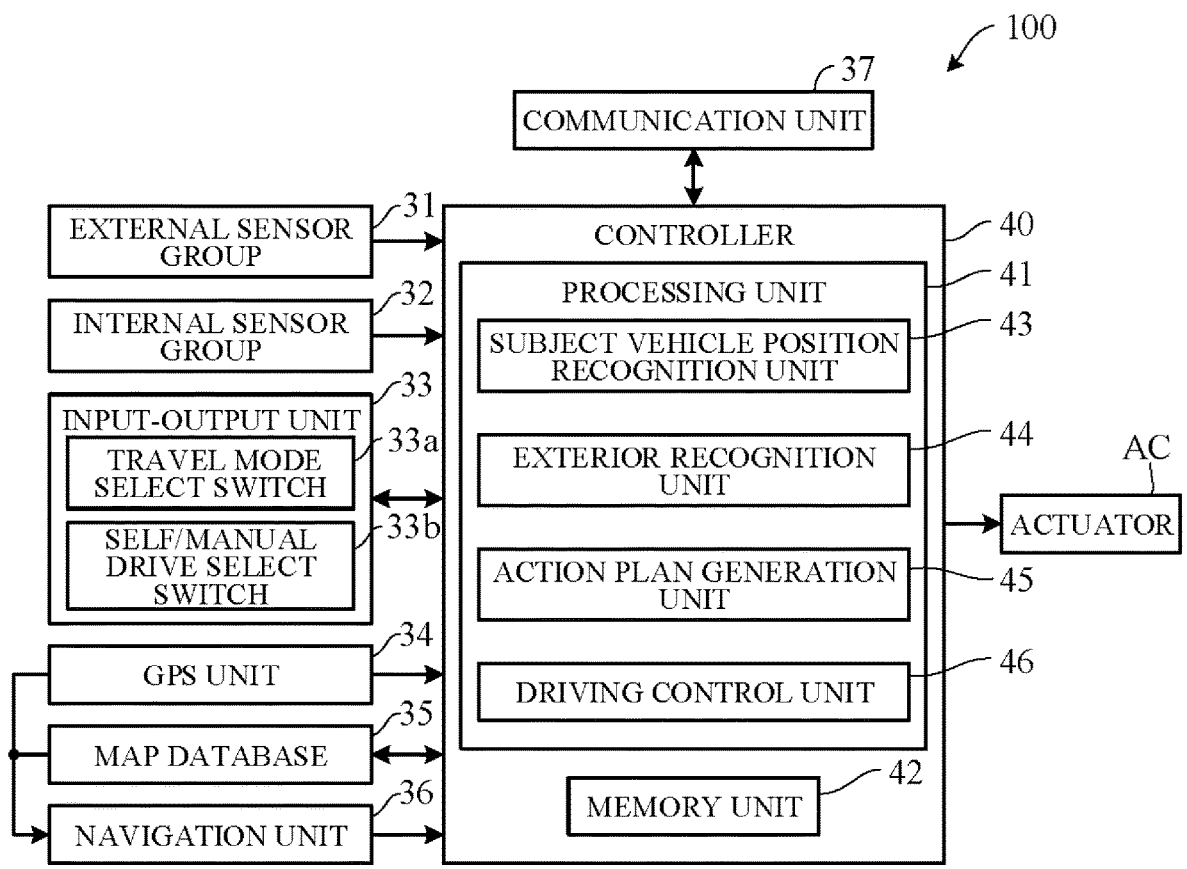
FIG. 2 is a block diagram schematically illustrating overall configuration of the vehicle travel control apparatus according to an embodiment of the present invention.

FIG. 2 is a block diagram schematically illustrating overall configuration of a vehicle travel control apparatus (vehicle travel control system) 100 according to an embodiment of the present invention. As shown in FIG. 2, the vehicle travel control apparatus 100 includes mainly of the controller 40, and as members communicably connected with the controller 40 through CAN (Controller Area Network) communication or the like, an external sensor group 31, an internal sensor group 32, an input-output unit 33, a GPS unit 34, a map database 35, a navigation unit 36, a communication unit 37, and actuators AC.

The term external sensor group 31 herein is a collective designation encompassing multiple sensors (external sensors) for detecting external circumstances constituting subject vehicle ambience data. For example, the external sensor group 31 includes, inter alia, a LIDAR (Light Detection and Ranging) for measuring distance from the vehicle to ambient obstacles by measuring scattered light produced by laser light radiated from the subject vehicle in every direction, a RADAR (Radio Detection and Ranging) for detecting other vehicles and obstacles around the subject vehicle by radiating electromagnetic waves and detecting reflected waves, and a CCD, CMOS or other image sensor-equipped on-board cameras for imaging subject vehicle ambience (forward, reward and sideways).

The term internal sensor group 32 herein is a collective designation encompassing multiple sensors (internal sensors) for detecting subject vehicle driving state. For example, the internal sensor group 32 includes, inter alia, an engine speed sensor for detecting engine rotational speed, a vehicle speed sensor for detecting subject vehicle running speed, acceleration sensors for detecting subject vehicle forward-rearward direction acceleration and lateral acceleration, respectively, a yaw rate sensor for detecting rotation angle speed around a vertical axis through subject vehicle center of gravity, and a throttle opening sensor for detecting throttle opening angle. The internal sensor group 32 also includes sensors for detecting driver driving operations in manual drive mode, including, for example, accelerator pedal operations, brake pedal operations, steering wheel operations and the like.

The term input-output unit 33 is used herein as a collective designation encompassing apparatuses receiving instructions input by the driver and outputting information to the driver. For example, the input-output unit 33 includes, inter alia, switches which the driver uses to input various instructions, a microphone which the driver uses to input voice instructions, a display for presenting information to the driver via displayed images, and a speaker for presenting information to the driver by voice. In FIG. 2, as an example of various switches constituting the input-output unit 33, a travel mode select switch 33a for instructing any of travel modes (normal mode, sport mode, or the like) and a self/manual drive select switch 33b for instructing either self-drive mode or manual drive mode are shown.

The travel mode select switch 33a, for example, is configured as a switch manually operable by the driver to output instructions of switching to the sport mode that prioritizes power performance over fuel economy performance when the switch is operated to ON and the normal mode that balances fuel economy performance and power performance when the switch is operated to OFF. Optionally, the travel mode select switch 33a can be configured to instruct switching to a mode other than normal and sport modes, for example, economy mode that prioritizes fuel economy performance over power performance.

The self/manual drive select switch 33b, for example, is configured as a switch manually operable by the driver to output instructions of switching to the self-drive mode enabling self-drive functions when the switch is operated to ON and the manual drive mode disabling self-drive functions when the switch is operated to OFF. Optionally, the self/manual drive select switch can be configured to instruct switching from manual drive mode to self-drive mode or from self-drive mode to manual drive mode when a predetermined condition is satisfied without operating the self/manual drive select switch. In other words, drive mode can be switched automatically not manually in response to automatic switching of the self/manual drive select switch.

The GPS unit 34 includes a GPS receiver for receiving position determination signals from multiple GPS satellites, and measures absolute position (latitude, longitude and the like) of the subject vehicle based on the signals received from the GPS receiver.

The map database 35 is a unit storing general map data used by the navigation unit 36 and is, for example, implemented using a hard disk. The map data include road position data and road shape (curvature etc.) data, along with intersection and road branch position data. The map data stored in the map database 35 are different from high-accuracy map data stored in a memory unit 42 of the controller 40.

The navigation unit 36 retrieves target road routes to destinations input by the driver and performs guidance along selected target routes. Destination input and target route guidance is performed through the input-output unit 33. Target routes are computed based on subject vehicle current position measured by the GPS unit 34 and map data stored in the map database 35.

The communication unit 37 communicates through networks including the Internet and other wireless communication networks to access servers (not shown in the drawings) to acquire map data, traffic data and the like, periodically or at arbitrary times. Acquired map data are output to the map database 35 and/or memory unit 42 to update their stored map data. Acquired traffic data include congestion data and traffic light data including, for instance, time to change from red light to green light.

The actuators AC are provided to perform driving of the vehicle 101. The actuators AC include a throttle actuator 13 for adjusting opening angle of the throttle valve of the engine 1 (throttle opening angle), a shift actuator 23 for changing speed stage of the transmission 2, a brake actuator for operating a braking device, and a steering actuator for driving a steering unit.

The controller 40 is constituted by an electronic control unit (ECU). In FIG. 2, the controller 40 is integrally configured by consolidating multiple function-differentiated ECUs such as an engine control ECU, a transmission control ECU, a clutch control ECU and so on. Optionally, these ECUs can be individually provided. The controller 40 incorporates a computer including a CPU or other processing unit (a microprocessor) 41, the memory unit (a memory) 42 of RAM, ROM, hard disk and the like, and other peripheral circuits not shown in the drawings.

The memory unit 42 stores high-accuracy detailed map data including, inter alia, lane center position data and lane boundary line data. More specifically, road data, traffic regulation data, address data, facility data, telephone number data and the like are stored as map data. The road data include data identifying roads by type such as expressway, toll road and national highway, and data on, inter alia, number of road lanes, individual lane width, road gradient, road 3D coordinate position, lane curvature, lane merge and branch point positions, and road signs. The traffic regulation data include, inter alia, data on lanes subject to traffic restriction or closure owing to construction work and the like. The memory unit 42 also stores a shift map (shift chart) serving as a shift operation reference, various programs for performing processing, and threshold values used in the programs, etc.

As functional configurations, the processing unit 41 includes a subject vehicle position recognition unit 43, an exterior recognition unit 44, an action plan generation unit 45, and a driving control unit 46.

The subject vehicle position recognition unit 43 recognizes map position of the subject vehicle (subject vehicle position) based on subject vehicle position data calculated by the GPS unit 34 and map data stored in the map database 35. Optionally, the subject vehicle position can be recognized using map data (building shape data and the like) stored in the memory unit 42 and ambience data of the vehicle 101 detected by the external sensor group 31, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 37.

The exterior recognition unit 44 recognizes external circumstances around the subject vehicle based on signals from cameras, LIDERs, RADARs and the like of the external sensor group 31. For example, it recognizes position, speed and acceleration of nearby vehicles (forward vehicle or rearward vehicle) driving in the vicinity of the subject vehicle, position of vehicles stopped or parked in the vicinity of the subject vehicle, and position and state of other objects. Other objects include traffic signs, traffic lights, road boundary and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 45 generates a subject vehicle driving path (target path) from present time point to a certain time ahead based on, for example, a target route computed by the navigation unit 36, subject vehicle position recognized by the subject vehicle position recognition unit 43, and external circumstances recognized by the exterior recognition unit 44. When multiple paths are available on the target route as target path candidates, the action plan generation unit 45 selects from among them the path that optimally satisfies legal compliance, safe efficient driving and other criteria, and defines the selected path as the target path. The action plan generation unit 45 then generates an action plan matched to the generated target path. An action plan is also called "travel plan".

The action plan includes action plan data set for every unit time Δt (e.g., 0.1 sec) between present time point and a predetermined time period T (e.g., 5 sec) ahead, i.e., includes action plan data set in association with every unit time Δt interval. The action plan data include subject vehicle position data and vehicle state data for every unit time Δt. The position data are, for example, target point data indicating 2D coordinate position on road, and the vehicle state data are vehicle speed data indicating vehicle speed, direction data indicating subject vehicle direction, and the like. Therefore, when accelerating the subject vehicle to target vehicle speed within the predetermined time period T, the action plan includes target vehicle speed data. The vehicle state data can be determined from position data change of successive unit times Δt. Action plan is updated every unit time Δt.

Figure 3:
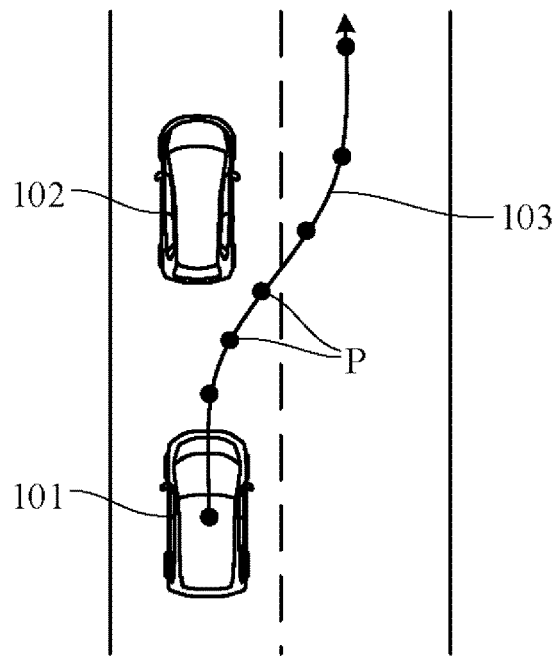
FIG. 3 is a diagram showing an example of an action plan generated by an action plan generation unit of FIG. 2.

FIG. 3 is a diagram showing an action plan generated by the action plan generation unit 45. FIG. 3 shows a scene depicting an action plan for the subject vehicle 101 when changing lanes and overtaking a vehicle 102 ahead. Points P in FIG. 3 correspond to position data at every unit time Δt between present time point and predetermined time period T1 ahead. A target path 103 is obtained by connecting the points P in time order. The action plan generation unit 45 generates not only overtake action plans but also various other kinds of action plans for, inter alia, lane-changing to move from one traffic lane to another, lane-keeping to maintain same lane and not stray into another, and decelerating or accelerating.

When generating a target path, the action plan generation unit 45 first decides a drive mode and generates the target path in line with the drive mode. When creating an action plan for lane-keeping, for example, the action plan generation unit 45 firsts decides drive mode from among modes such as cruising, overtaking, decelerating, and curve negotiating. To cite particular cases, the action plan generation unit 45 decides cruising mode as drive mode when no other vehicle is present ahead of the subject vehicle (no forward vehicle) and decides following mode as drive mode when a vehicle ahead is present. In following mode, the action plan generation unit 45 generates, for example, travel plan data for suitably controlling inter-vehicle distance to a forward vehicle in accordance with vehicle speed.

Further, the action plan generation unit 45 determines whether an obstacle is present based on signals from the external sensor group 31 and whether an avoidance action for avoiding the obstacle is necessary. When it is determined that the avoidance action is necessary, the action plan generation unit 45 generates an action plan (target path) so as to avoid the obstacle.

In self-drive mode, the driving control unit 46 controls the actuators AC to drive the subject vehicle 101 along target path 103 generated by the action plan generation unit 45. For example, the driving control unit 46 controls the throttle actuator 13, shift actuator 23, brake actuator and steering actuator so as to drive the subject vehicle 101 through the points P of the unit times Δt in FIG. 3.

More specifically, in self-drive mode, the driving control unit 46 calculates acceleration (target acceleration) of sequential unit times Δt based on vehicle speed (target vehicle speed) at points P of sequential unit times Δt on target path 103 (FIG. 3) included in the action plan generated by the action plan generation unit 45. In addition, the driving control unit 46 calculates required driving force for achieving the target accelerations taking running resistance caused by road gradient and the like into account. And the actuators AC are feedback controlled to bring actual acceleration detected by the internal sensor group 32, for example, into coincidence with target acceleration. On the other hand, in manual drive mode, the driving control unit 46 controls the actuators AC in accordance with driving instructions by the driver (accelerator opening angle and the like) acquired from the internal sensor group 32.

Controlling of the transmission 2 by the driving control unit 46 is explained concretely. The driving control unit 46 controls shift operation (shifting) of the transmission 2 by outputting control signals to the shift actuator 23 using a shift map stored in the memory unit 42 in advance to serve as a shift operation reference.

Figure 4:
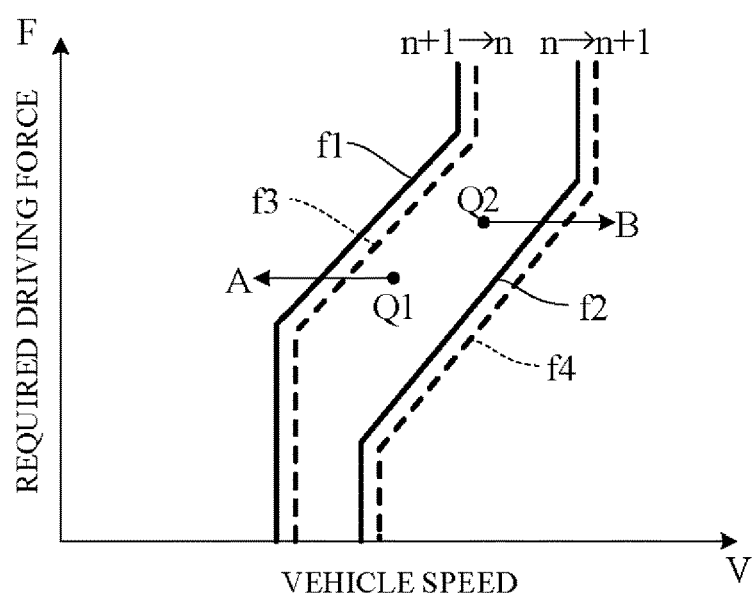
FIG. 4 is a diagram showing an example of a shift map used in shift controlling by the vehicle travel control apparatus according to the embodiment of the present invention.

FIG. 4 is a diagram showing an example of the shift map stored in the memory unit 42. In the drawing, horizontal axis is scaled for vehicle speed V and vertical axis for required driving force F. Required driving force F is in one-to-one correspondence to accelerator opening angle which is an amount of operation of an accelerator (in self-drive mode, simulated accelerator opening angle) or throttle opening angle, and required driving force F increases with increasing accelerator opening angle or throttle opening angle. Therefore, the vertical axis can instead be scaled for accelerator opening angle or throttle opening angle.

In FIG. 4, characteristic curve f1 (solid line) is an example of a downshift curve corresponding to downshift from n+1 stage to n stage in self-drive mode and characteristic curve f2 (solid line) is an example of an upshift curve corresponding to upshift from n stage to n+1 stage in self-drive mode. Characteristic curve f3 (dashed line) is an example of a downshift curve corresponding to downshift from n+1 stage to n stage in manual drive mode and characteristic curve f4 (dashed line) is an example of an upshift curve corresponding to upshift from n stage to n+1 stage in manual drive mode. Characteristic curves f3 and f4 are downshift curve and upshift curve in normal mode, for example, and downshift curve and upshift curve in sport mode are obtained by shifting characteristic curves f3 and f4 to high vehicle speed side. Characteristic curves f3 and f4 are shifted to high vehicle speed side than characteristic curves f1 and f2, respectively.

For example, considering downshift from operating point Q1 in FIG. 4, in a case where vehicle speed V decreases under constant required driving force F, the transmission 2 downshifts from n+1 stage to n stage when operating point Q1 crosses downshift curves (characteristic curves f1, f3; arrow A). Also, in a case where required driving force F increases under constant vehicle speed V, the transmission 2 downshifts when operating point Q1 crosses downshift curves.

On the other hand, considering upshift from operating point Q2, in a case where vehicle speed V increases under constant required driving force F, the transmission 2 upshifts from n stage to n+1 stage when operating point Q2 crosses upshift curves (characteristic curves f2, f4; arrow B). Also, in a case where required driving force F decreases under constant vehicle speed V, the transmission 2 upshifts when operating point Q1 crosses upshift curves. Downshift curves and upshift curves are shifted to high speed side along with an increase of speed stage.

Characteristic curves f3 and f4 in manual drive mode (normal mode) are characteristic curves that balance fuel economy performance and power performance, and characteristic curves (not shown in FIG) in sport mode shifting characteristic curves f3 and f4 to high speed side are characteristic curves that prioritizes power performance over fuel economy performance. On the other hand, characteristic curves f1 and f2 in self-drive mode are characteristic curves that prioritize fuel economy performance or silent performance over power performance. Since characteristic curves f1 and f2 are shifted to low vehicle speed side than characteristic curves f3 and f4, upshift time is advanced and downshift time is delayed in self-drive mode. Therefore, the subject vehicle in self-drive mode tends to travel at speed stage greater than in manual drive mode.

Suppose regarding the vehicle travel control apparatus 100 that, for example, manual drive mode is switched to self-drive mode by switching of the self/manual drive select switch 33b when the subject vehicle is accelerating in manual drive mode. When the downshift curve changes from characteristic curve f4 to characteristic curve f2 at this time, the transmission 2 upshifts early, so that vehicle running acceleration is apt to decrease. As a result, the driver does not get desired sense of acceleration and is left with a strong feeling of oddness. Prohibiting the very act of switching to self-drive mode in order to avoid such events increases burden on the driver by requiring the driver to continue driving manually. In the light of this issue, the vehicle travel control apparatus 100 according to the present embodiment is configured as set out in the following.

Figure 5:
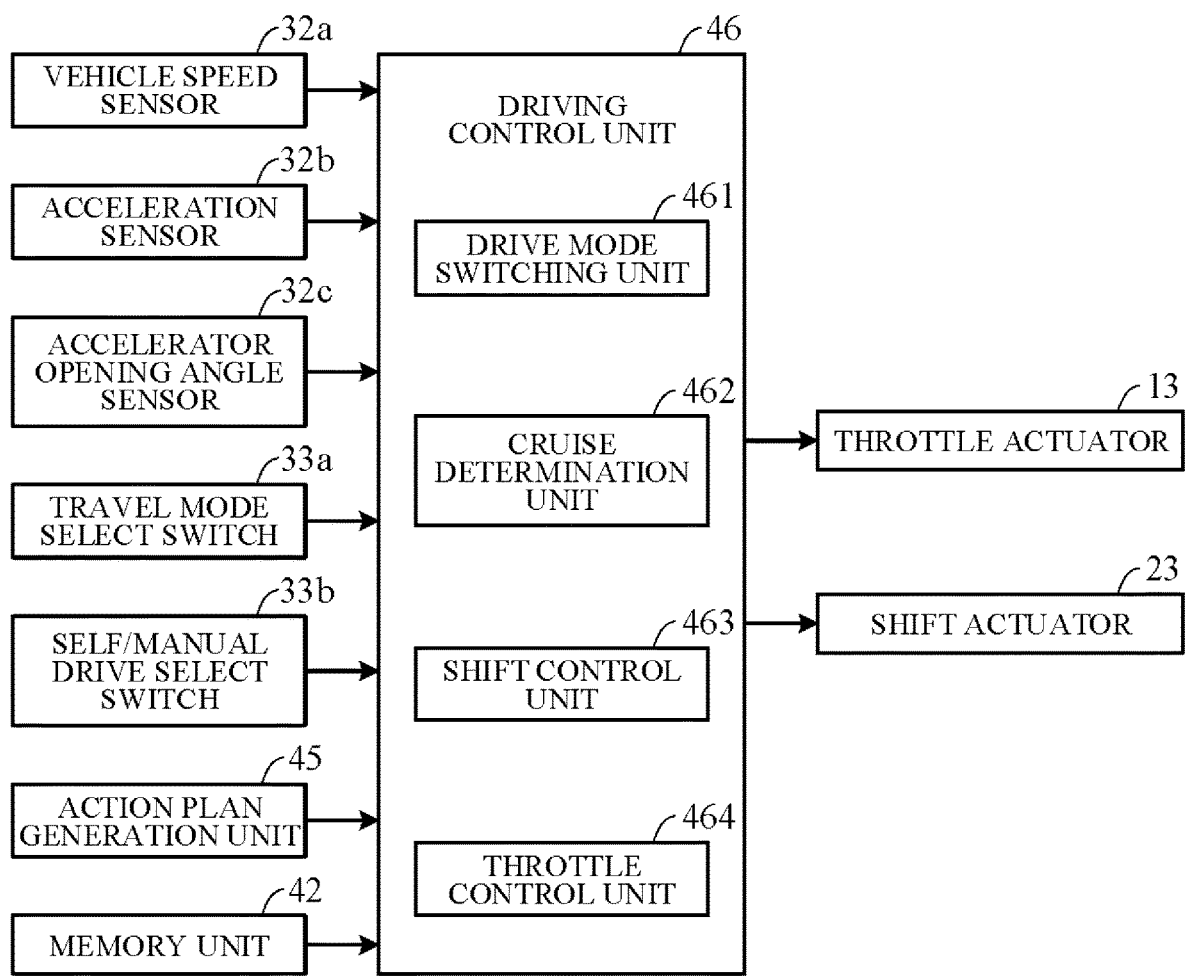
FIG. 5 is a block diagram illustrating main configuration of the vehicle travel control apparatus according to the embodiment of the present invention.

FIG. 5 is a block diagram showing main components of a vehicle travel control apparatus 100 in accordance with an embodiment of the present invention. FIG. 5 is a diagram concretely elaborating on part of the configuration of the vehicle travel control apparatus 100 of FIG. 2, particularly on features related to shift control of the driving control unit 46. As shown in FIG. 5, the driving control unit 46 receives signal input from a vehicle speed sensor 32a, an acceleration sensor 32b, an accelerator opening angle sensor 32c, the travel mode select switch 33a, the self/manual drive select switch 33b, the action plan generation unit 45, and the memory unit 42. Among these, the vehicle speed sensor 32a, acceleration sensor 32b and accelerator opening angle sensor 32c are members of the internal sensor group 32 of FIG. 2. The driving control unit 46 performs predetermined processing based on these input signals and outputs control signals to the throttle actuator 13 and the shift actuator 23.

More specifically, the driving control unit 46 includes as functional constituents a drive mode switching unit 461, a cruise determination unit 462, a shift control unit 463, and a throttle control unit 464.

The drive mode switching unit 461 switches drive mode based on signals from the travel mode select switch 33a and the self/manual drive select switch 33b. In manual drive mode, for example, the drive mode switching unit 461 switches to normal mode or sport mode in accordance with a signal from the travel mode select switch 33a. Moreover, it switches to manual drive mode or self-drive mode in accordance with a signal from the self/manual drive select switch 33b.

The cruise determination unit 462 determines based on a signal from the vehicle speed sensor 32a whether the subject vehicle is in cruising condition (first cruising condition, second cruising condition, or third cruising condition). For example, first cruising condition is determined when deviation ΔV between vehicle speed V detected by the vehicle speed sensor 32a and target vehicle speed Va is equal to or less than first predetermined value ΔV1, and second cruising condition is determined when deviation ΔV between detected vehicle speed V and target vehicle speed Va is equal to or less than second predetermined value ΔV2 which is smaller than first predetermined value ΔV1. Third cruising condition is determined when second cruising condition continues for predetermined time period Δt1.

Optionally, first cruising condition, second cruising condition and third cruising condition can be determined based on signals from the acceleration sensor 32b instead of from the vehicle speed sensor 32a. Specifically, first cruising condition is determined when running acceleration detected by the acceleration sensor 32b is equal to or less than first predetermined value, second cruising condition is determined when it is equal to or less than second predetermined value which is smaller than first predetermined value, and third cruising condition is determined when second cruising condition continues for predetermined time period.

In manual drive mode, the shift control unit 463 is responsive to vehicle speed detected by the vehicle speed sensor 32a and accelerator opening angle detected by the accelerator opening angle sensor 32c, for upshifting or downshifting the transmission 2 by outputting a control signal to the shift actuator 23 in accordance with characteristics stored in the memory unit 42 (e.g., in accordance with characteristic curve f3 or f4 of FIG. 4). In self-drive mode, the shift control unit 463 is responsive to vehicle speed detected by the vehicle speed sensor 32a and required driving force output from the action plan generation unit 45, for upshifting or downshifting the transmission 2 by outputting a control signal to the shift actuator 23 in accordance with characteristics stored in the memory unit 42 (e.g., in accordance with characteristic curve f1 or f2 of FIG. 4).

In manual drive mode, the shift control unit 463 also responds to an instruction to switch to self-driving when running at acceleration of predetermined value Ga or greater by controlling shift operation in accordance with a manual driving shift map until the cruise determination unit 462 determines cruising condition (e.g., third cruising condition). Then upon third cruising condition being determined by the cruise determination unit 462, the shift control unit 463 controls shift operation in accordance with a self-driving shift map. When the action plan generation unit 45 determines that obstacle avoidance action is necessary, the shift control unit 463 controls shift operation in accordance with the self-driving shift map even before the cruise determination unit 462 determines third cruising condition.

The throttle control unit 464 controls throttle opening angle by outputting a control signal to the throttle actuator 13, in accordance with driver's accelerator pedal operation when in manual drive mode and in accordance with required driving force when in self-drive mode. In manual drive mode, the throttle control unit 464 also responds to an instruction to switch to self-driving when running at acceleration of predetermined value Ga or greater by controlling throttle opening angle so as to maintain acceleration until the cruise determination unit 462 determines first cruising condition. Then, upon first cruising condition being determined, the throttle control unit 464 controls throttle opening angle to gradually lower acceleration until second cruising condition is determined. When second cruising condition is determined, the throttle control unit 464 controls throttle opening angle so that the vehicle speed maintains target vehicle speed until third cruising condition is determined. This controlling of throttle opening angle is performed in accordance with an action plan generated by the action plan generation unit 45.

Figure 6:
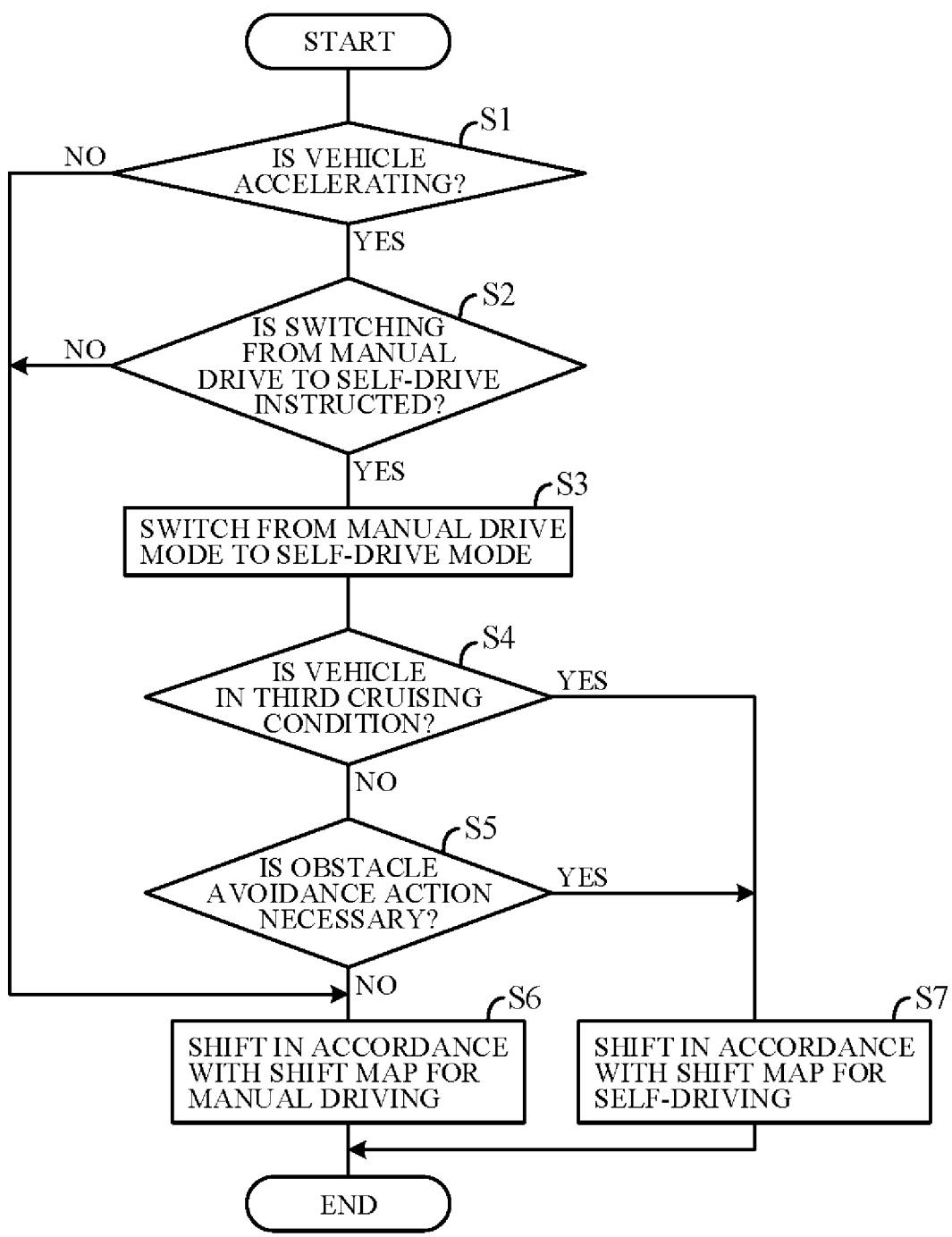
FIG. 6 is a flow chart showing an example of processing performed by a driving control unit of FIG. 5.

FIG. 6 is a flowchart showing an example of processing, chiefly processing in the driving control unit 46 related to speed shift control, performed by the CPU of the controller 40 in accordance with a program stored in the memory unit 42 in advance. The processing indicated in this flowchart is, for example, commenced in a state with manual drive mode instructed by the self/manual drive select switch 33b and periodically repeated at predetermined intervals.

First, in S1 (S: processing Step), whether acceleration G detected by the acceleration sensor 32b is equal to or greater than predetermined value Ga which is greater than 0, i.e., whether subject vehicle is accelerating, is determined. Optionally, whether subject vehicle is accelerating can be determined based on detection value of the vehicle speed sensor 32a. If a positive decision is made in S1, the routine proceeds to S2 to determine based on a signal from the self/manual drive select switch 33b whether switching from manual drive mode to self-drive mode is instructed either by a driver switch operation or automatically without a switch operation.

If a positive decision is made in S2, the routine proceeds to S3, in which the drive mode switching unit 461 switches drive mode from manual drive mode to self-drive mode. Next, in S4, the cruise determination unit 462 determines whether the subject vehicle is in cruising condition (e.g., third cruising condition). Specifically, the cruise determination unit 462 determines whether state of deviation ΔV between vehicle speed V detected by the vehicle speed sensor 32a and target vehicle speed Va being maintained equal to or less than second predetermined value ΔV2 smaller than first predetermined value ΔV1 continued for or longer than predetermined time period Δt1. If a negative decision is made in S4, the routine proceeds to S5 to determine whether obstacle avoidance action is necessary. This determination is performed by the action plan generation unit 45.

If a negative decision is made in S5, the routine proceeds to S6, in which the shift control unit 463 controls shift operation of the transmission 2 in accordance with a shift map for manual driving (e.g., characteristic curve f3 or f4 of FIG. 4). In this case, when normal mode is in effect immediately before the switch to self-drive mode, a shift map for normal mode, and when sport mode is in effect, a shift map for sport mode, is used to control shift operation. In other words, shift operation is controlled using the shift map used in manual drive mode without modification. Also if a negative decision is made in S1 or S2, the routine proceeds to S6 to control shift operation in accordance with the shift map for manual driving.

On the other hand, if a positive decision is made in S4 or S5, the routine proceeds to S7, in which the shift control unit 463 controls shift operation of the transmission 2 in accordance with a shift map for self-driving (e.g., characteristic curve f1 or f2 of FIG. 4).

Although not shown in the drawings, after switching to self-drive mode in S3 but before determination of third cruising condition in S4, the throttle control unit 464 controls throttle opening angle so as to maintain acceleration determined in S1 until the cruise determination unit 462 determines first cruising condition. Once the cruise determination unit 462 determines first cruising condition, the throttle control unit 464 controls throttle opening angle so as to gradually lower acceleration until second cruising condition is determined. Moreover, when second cruising condition is determined, the throttle control unit 464 controls throttle opening angle so that the vehicle maintains target vehicle speed until third cruising condition is determined.

Figure 7:
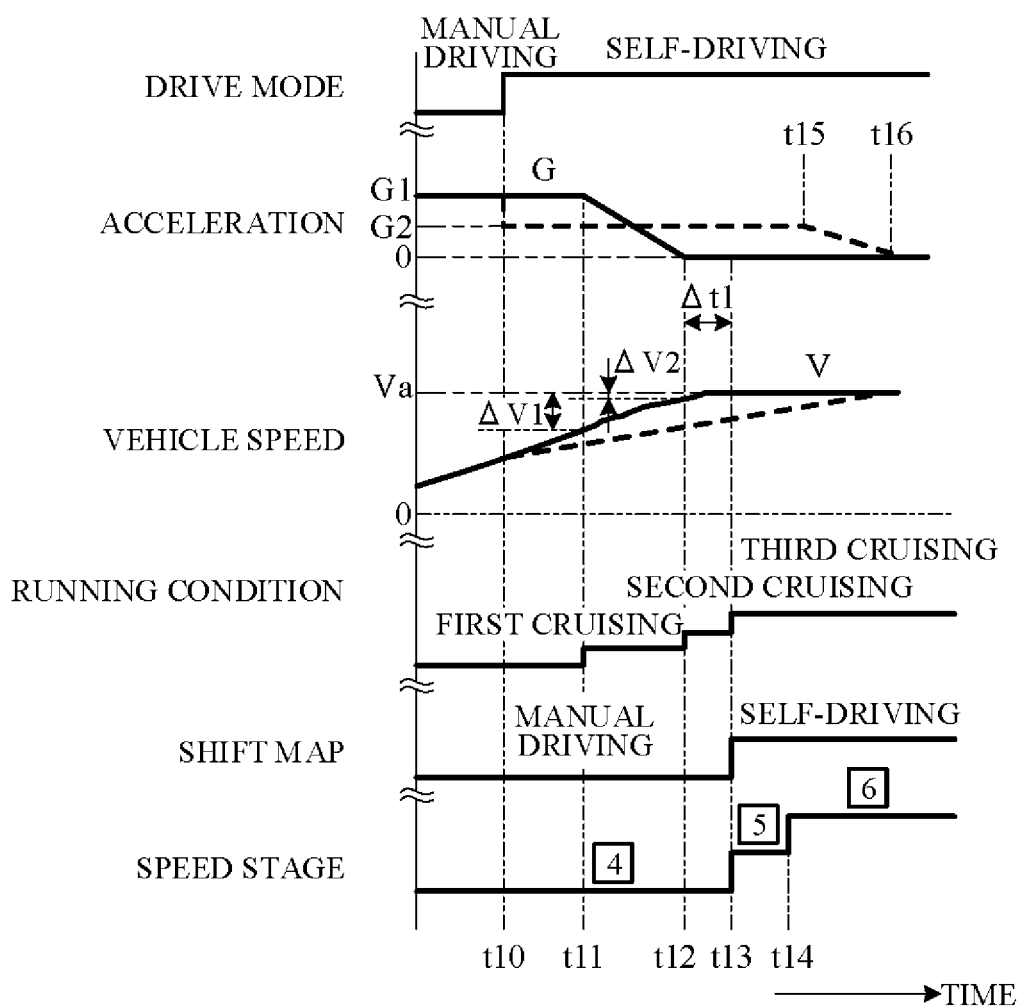
FIG. 7 is a time chart showing an example of operation by the vehicle travel control apparatus according to the embodiment of the present invention.

A more detailed explanation of main operations of the vehicle travel control apparatus 100 according to an embodiment of the present invention follows. FIG. 7 is a time chart showing an example of operation when switching to self-drive mode is instructed in the middle of accelerating toward target vehicle speed Va in manual drive mode. When no vehicle is present ahead or inter-vehicle distance to forward vehicle is equal to or greater than predetermined distance, target vehicle speed Va is, for example, set to legal speed limit. On the other hand, when inter-vehicle distance to forward vehicle is less than predetermined distance and the forward vehicle is to be followed, target vehicle speed Va is, for example, set to same vehicle speed as forward vehicle.

As shown in FIG. 7, when switching to self-drive mode is instructed at time t10 by switching of the self/manual drive select switch 33b while running in manual drive mode at predetermined acceleration G1 (>0) in fourth speed, drive mode switches to self-drive mode (S3). Even after drive mode is switched to self-drive mode, speed stage is controlled by the shift control unit 463 in accordance with a manual driving shift map to maintain fourth speed at least while target acceleration is in stable state (S6).

At this time, the action plan generation unit 45 generates an action plan including target acceleration in accordance with determination result of the cruise determination unit 462. The action plan is generated so that, up to reaching first cruising condition, predetermined acceleration G1 is set as target acceleration, and when deviation ΔV between vehicle speed V and target vehicle speed Va falls to or below predetermined value ΔV1, i.e., when running condition assumes first cruising condition, target acceleration is gradually lowered along with decreasing deviation ΔV, and when deviation ΔV between vehicle speed V and target vehicle speed Va thereafter falls to or below predetermined value ΔV2, i.e., when running condition assumes second cruising condition, target acceleration is set to 0. Target acceleration is thereafter maintained at 0 so as to maintain vehicle speed V at target vehicle speed Va.

Acceleration changes in accordance with this action plan as indicated by a solid line in FIG. 7. Specifically, acceleration G is predetermined acceleration G1 until running condition reaches first cruising condition. Then when running condition reaches first cruising condition at time t11, acceleration gradually decreases until second cruising condition is reached at time t12, and acceleration G becomes 0 at time t12. When this state continues for predetermined time period Δt1, running condition assumes third cruising condition at time t13, whereupon shift operation comes to be controlled in accordance with a self-driving shift map (S7). Speed stage is therefore sequentially upshifted to, for example, fifth speed at time t13 and sixth speed at time t16.

Thus in the present embodiment, drive mode is switched from manual drive mode to self-drive mode by a switching instruction from the self/manual drive select switch 33b, and shift operation is controlled in accordance with a manual driving shift map until running condition becomes third cruising condition upon passage of predetermined time period Δt1 after deviation ΔV between vehicle speed V and target vehicle speed Va falls to or below predetermined value ΔV2. Since acceleration G can therefore be held constant (at predetermined acceleration G1) between before and after switching of drive mode, odd sensation felt by the driver is minimal.

The aforesaid control for holding acceleration G constant during drive mode switching is for convenience herein termed acceleration constant control. Acceleration constant control is performed by using the action plan generation unit 45 to set target accelerations to individual unit times Δt as indicated by a solid line in FIG. 7 and controlling the throttle actuator 13 and/or shift actuator 23 in accordance with these target accelerations. In acceleration constant control, a manual driving shift map is used to control the transmission 2 until vehicle speed V reaches target vehicle speed Va, so that the driver feels nothing odd and vehicle speed V can be quickly increased to target vehicle speed Va.

In contrast, when differently from in the present embodiment, shift control is performed based on a self-driving shift map without performing acceleration constant control when switching to self-drive mode (e.g., when running in self-drive mode from the start), acceleration G becomes, for example, predetermined acceleration G2 lower than predetermined acceleration G1 in accordance with the action plan. For convenience, this is termed ordinary control herein. In ordinary control, as shown by a dashed line in FIG. 7, acceleration G decreases from G1 to G2 at time t10, whereafter predetermined acceleration G2 is maintained. When deviation ΔV between vehicle speed V and target vehicle speed Va thereafter falls to or below predetermined value at time t15, acceleration gradually decreases to 0 at time t16. As a result, odd sensation felt by the driver with respect to change of acceleration G at time t10 intensifies, and since time required for vehicle speed V to reach target vehicle speed Va becomes longer, driver satisfaction with autonomous driving diminishes.

Figure 8:
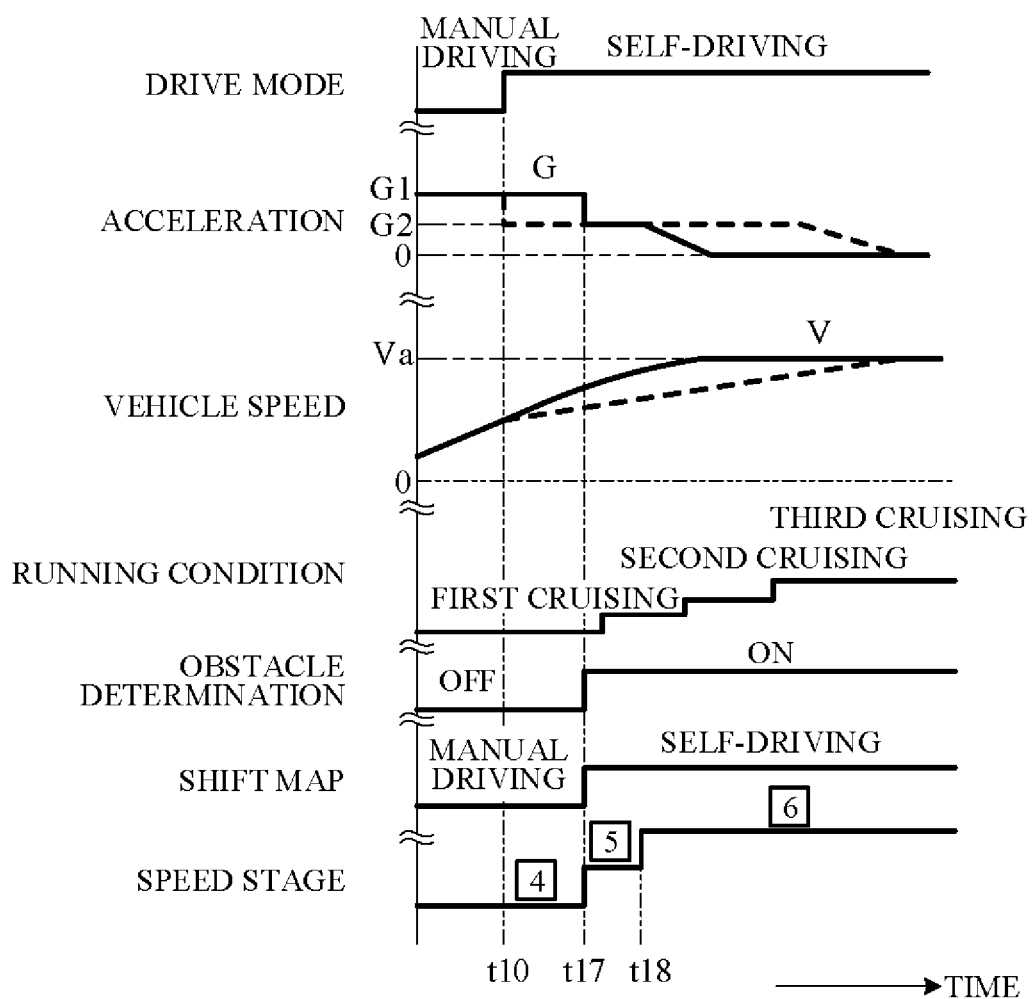
FIG. 8 is a time chart showing another example of operation by the vehicle travel control apparatus according to the embodiment of the present invention.

FIG. 8 is a time chart showing an example of operation in a case where the action plan generation unit 45 determines need for obstacle avoidance action after the aforesaid switching from manual drive mode to self-drive mode. As indicated by a solid line in FIG. 8, when at time t17, prior to reaching first cruising condition, obstacle avoidance action is determined necessary, acceleration constant control transitions to ordinary control. Acceleration G therefore decreases from G1 to G2 at time t17, and when deviation ΔV between vehicle speed V and target vehicle speed Va thereafter falls to or below predetermined value, acceleration G gradually decreases from predetermined acceleration G2 to 0.

In this case, the shift control unit 463 controls shift operation after time t10 in accordance with a self-driving shift map (S7). As a result, the transmission 2 upshifts earlier than when acceleration constant control remains in effect, e.g., to fifth speed at time t17 and to sixth speed at time t18. Thus when obstacle avoidance action is determined necessary, shift operation is controlled based on a self-driving shift map irrespective of whether in cruising condition or not, so that shift operation suitable for self-driving can be realized. The dashed lines in FIG. 8 are the same as the dashed lines in FIG. 7.

Figure 9:
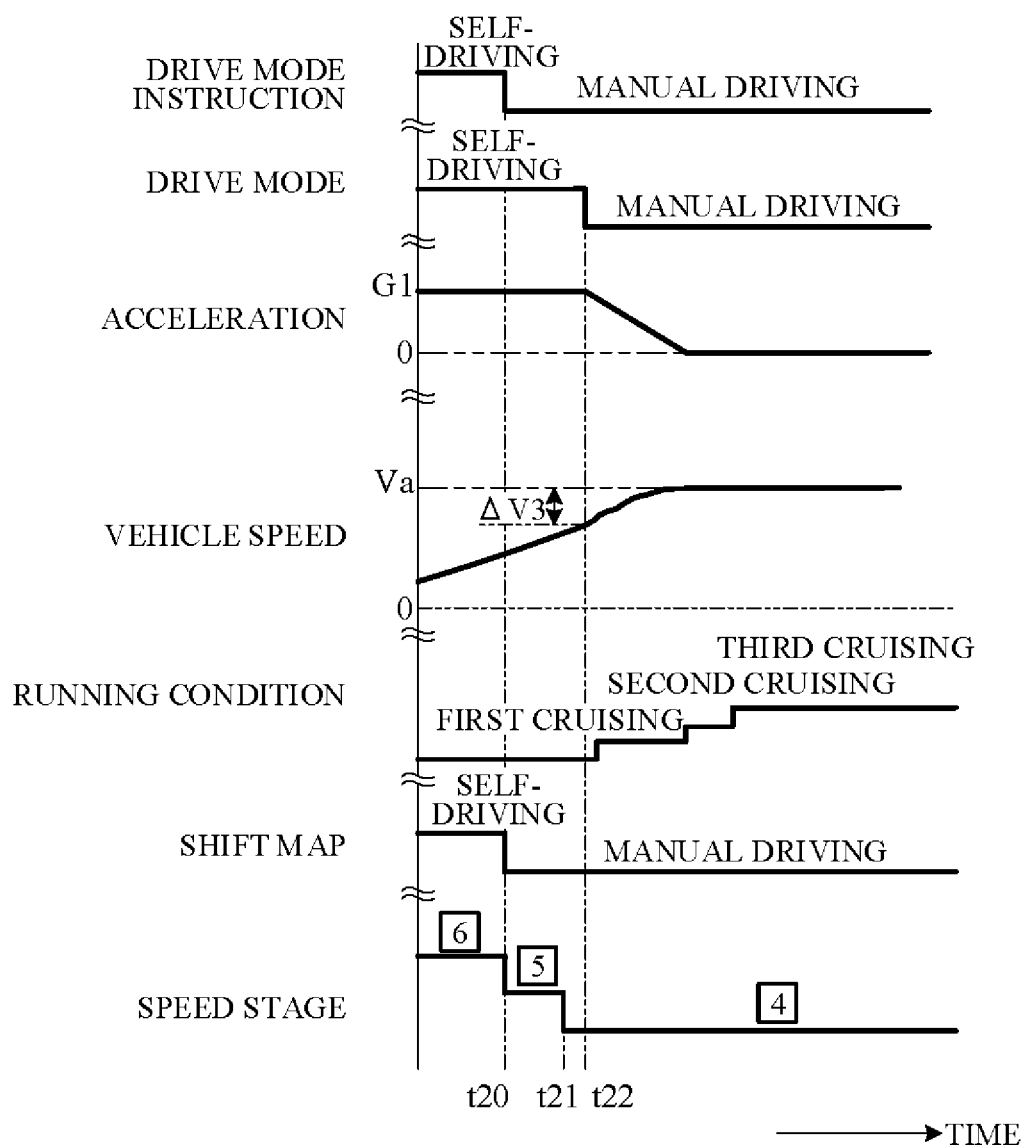
FIG. 9 is a time chart showing further other example of operation by the vehicle travel control apparatus according to the embodiment of the present invention.

The aforesaid explanation relates to an example of operation when switching from manual drive mode to self-drive mode is instructed during acceleration. Operation when switching from self-drive mode to manual drive mode is instructed is as explained below, for example. FIG. 9 is a time chart indicating an example of operation when switching to manual drive mode is instructed in the course of accelerating toward target vehicle speed Va in self-drive mode.

As shown in FIG. 9, when switching to manual drive mode is instructed by the self/manual drive select switch 33b at time t20 while running in self-drive mode at predetermined acceleration G1 (>0) in sixth speed, the shift control unit 463 controls shift operation using the manual driving shift map with drive mode kept in self-drive mode. Therefore, for example, the transmission 2 downshifts from sixth speed to fifth speed at time t20 and further from fifth speed to fourth speed a time t21. When deviation ΔV between vehicle speed V and target vehicle speed Va thereafter falls to or below predetermined deviation ΔV3 at time t22, self-drive mode switches to manual drive mode. Thus when switching to manual drive mode is instructed during acceleration in self-drive mode, shift operation is controlled in accordance with a manual driving shift map until vehicle speed V nears target vehicle speed Va, and since drive mode is switched to manual drive mode thereafter, switching from self-driving to manual driving can be smoothly performed.

The present embodiment can achieve advantages and effects such as the following:

(1) The vehicle travel control apparatus 100 is configured to control the engine 1, transmission 2 and other equipment (actuators) for driving a vehicle, and includes: the self/manual drive select switch 33b for instructing manual drive mode or self-drive mode; the action plan generation unit 45 for generating an action plan implemented in self-drive mode; the vehicle speed sensor 32a for detecting vehicle speed V; the cruise determination unit 462 for determining whether deviation ΔV between vehicle speed V detected by the vehicle speed sensor 32a and target vehicle speed Va included in the action plan generated by the action plan generation unit 45 is equal to or less than predetermined value ΔV1; the drive mode switching unit 461 for switching drive mode in accordance with instruction of the self/manual drive select switch 33b; and the driving control unit 46 for controlling, inter alia, the engine 1 (throttle actuator 13) and the transmission 2 (shift actuator 23) in accordance with the action plan generated by the action plan generation unit 45 when in self-drive mode (FIG. 5). The drive mode switching unit 461 is configured to switch from manual drive mode to self-drive mode, when switching from the manual drive mode to the self-drive mode is instructed by the self/manual drive select switch 33b during acceleration running in manual drive mode. The driving control unit 46 is configured to control the engine 1 and transmission 2 so as to maintain an acceleration G1 in manual drive mode at least until vehicle speed deviation ΔV is determined to be equal to or less than predetermined value ΔV1, when switching from manual drive mode to self-drive mode is instructed by the self/manual drive select switch 33b during acceleration running in manual drive mode (FIG. 7).

This enables switching from manual drive mode to self-drive mode without producing an unusual feel. The point here is that, in contrast to in manual drive mode when the subject vehicle accelerates in response to accelerator pedal depression, in self-drive mode acceleration is controlled in response to surrounding circumstances in accordance with, for example, fuel-economy prioritized characteristics. Acceleration up to target vehicle speed Va in manual drive mode therefore sometimes differs from acceleration up to the same target vehicle speed Va in self-drive mode. So when switching to self-drive mode is instructed during running at predetermined acceleration G1, if target acceleration should be switched to acceleration (G2 of FIG. 7) for self-drive mode (ordinary control), acceleration would fall from G1 to G2 and give the driver a pronounced odd feeling regarding change in vehicle behavior. On this issue, in the present embodiment, notwithstanding that drive mode is switched to self-drive mode when switching to self-drive mode is instructed during running at predetermined acceleration G1, acceleration is not simultaneously changed but is maintained at the acceleration G1 of manual drive mode. Therefore, since no change in vehicle behavior occurs immediately after switching to self-drive mode, passengers can enjoy a pleasant ride without providing a feeling of strangeness. In other words, even in a case of switching to self-drive mode being instructed during acceleration in manual drive mode, switching to self-drive mode can be smoothly achieved without causing an unusual feel.

(2) The transmission 2 is shifted based on shift maps stored in memory in advance, i.e., in accordance with characteristic curve f1 or f2 of a self-driving shift map or in accordance with characteristic curve f3 or f4 of a manual driving shift map shown in FIG. 4. The driving control unit 46 controls shifting of the transmission 2 in accordance with a manual driving shift map at least until the cruise determination unit 462 determines that deviation ΔV is equal to or less than predetermined value ΔV1, more strictly speaking until the cruise determination unit 462 determines that ΔV is equal to or less than predetermined value ΔV2 (<ΔV1) and that driving condition is third cruising condition after passage of predetermined time period Δt1, when switching from manual drive mode to self-drive mode is instructed by the self/manual drive select switch 33b during acceleration in manual drive mode (FIGS. 6 and 7). Owing to control of shift operation (shifting) of the transmission 2 in accordance with a manual driving shift map in this manner, early upshifting of the transmission 2 during acceleration can be prevented and vehicle speed V can be quickly increased to target vehicle speed Va.

(3) The driving control unit 46 controls shift operation of the transmission 2 in accordance with a manual driving shift map until state of deviation ΔV being equal to or less than second predetermined value ΔV2 determined by cruise determination unit 462 continues for predetermined time period Δt1, when switching from manual drive mode to self-drive mode is instructed by the self/manual drive select switch 33b during acceleration in manual drive mode (FIGS. 6 and 7). This enhances cruising discrimination accuracy and enables cruising at target vehicle speed Va to be accurately achieved because shift operation is controlled in accordance with a manual driving shift map until the subject vehicle assumes cruising condition.

(4) The vehicle travel control apparatus 100 further includes the external sensor group 31 for detecting obstacles and the action plan generation unit 45 for determining whether avoidance action is necessary for avoiding obstacles detected by the external sensor group 31 while running in self-drive mode (FIG. 2).

When manual drive mode is switched to self-drive mode owing to instruction by the self/manual drive select switch 33b to switch from manual drive mode to self-drive mode when the subject vehicle is accelerating in manual drive mode and shift operation of the transmission 2 is therefore being controlled in accordance with a manual driving shift map, the driving control unit 46 controls shift operation of the transmission 2 in accordance with a self-driving shift map in a case that avoidance action is determined to be necessary by the action plan generation unit 45 (FIGS. 6 and 8). Thus when obstacle avoidance action is determined to be necessary, a shift map suitable for self-drive mode is used, whereby self-driving is appropriately performed in accordance with the action plan so as to enable obstacle avoidance in strict compliance with the action plan.

(5) When switching from self-drive mode to manual drive mode is instructed by the self/manual drive select switch 33b during acceleration in self-drive mode, the driving control unit 46 controls shift operation in accordance with a manual driving shift map and prohibits switching to manual drive mode until the cruise determination unit 462 determines deviation ΔV is equal to or less than ΔV3 (FIG. 9). Therefore, since shift operation is controlled using a manual driving shift map during acceleration, switching from self-drive mode to manual drive mode can be smoothly performed when vehicle speed V nears target vehicle speed Va. In other words, drive mode switching can be favorably performed because the shift map is switched from one for self-driving to one for manual driving in advance of switching drive mode.

Various modifications of the aforesaid embodiment are possible. Some examples are explained in the following. In the aforesaid embodiment, the travel mode select switch 33a is adapted to instruct either normal mode or sport mode, but the travel mode select switch 33a can be omitted and travel mode be fixed, for example, in normal mode. In the aforesaid embodiment, either manual drive mode or self-drive mode is instructed by manually or automatically switching the self/manual drive select switch 33b, but a drive mode instruction switch is not limited to this configuration. For example, the driver can be allowed to instruct switching of travel mode by voice input.

In the aforesaid embodiment, vehicle speed is detected by the vehicle speed sensor 32a, but a vehicle speed detector is not limited to this configuration. In the aforesaid embodiment, the cruise determination unit 462 is adapted to determine a running condition from among the first cruising condition in which deviation ΔV of vehicle speed V with respect to target vehicle speed Va is equal to or less than first predetermined value ΔV1, the second cruising condition in which deviation ΔV is equal to or less than second predetermined value ΔV2 and the third cruising condition in which second cruising condition is continued for predetermined time period Δt1, and acceleration G1 during manual drive mode (more exactly, immediately before switching to self-drive mode) is maintained until the first cruising condition is determined after switching to self-drive mode, but a driving control unit is not limited to the aforesaid configuration and acceleration in manual drive mode can instead be maintained until second cruising condition or third cruising condition is determined. For example, predetermined acceleration G1 during manual drive mode can be maintained until deviation ΔV falls to or below predetermined value ΔV2, and acceleration be made 0 when deviation ΔV falls to or below predetermined value ΔV2. In the action plan generation unit 45, it suffices to set target acceleration corresponding to this operation.

In the aforesaid embodiment, shift operation is controlled using a manual driving shift map (second characteristic curve) until third cruising condition is determined, but a driving control unit is not limited to the aforesaid configuration in this regard either, and it is possible instead to control speed ratio shifting using a manual driving shift map until first cruising condition or second cruising condition is determined and to control speed ratio shifting using a self-driving shift map (first characteristic curve) when first cruising condition or second cruising condition is determined.

In the aforesaid embodiment, the driving control unit 46 maintains acceleration in manual drive mode when switching from manual drive mode to self-drive mode is instructed during acceleration, but acceleration (negative acceleration) in manual drive mode can be similarly maintained also when switching from manual drive mode to self-drive mode is instructed during deceleration. In the aforesaid embodiment, the cruise determination unit 462 serving as a vehicle speed determining unit determines whether running condition is first cruising condition, second cruising condition or third cruising condition, but it can instead be adapted to determine only one of these conditions. In other words, the cruise determination unit 462 can be adapted to determine simply whether running condition is cruising condition, and a driving control unit can be adapted to control the engine 1 and transmission 2 to maintain acceleration in manual drive mode until running condition is determined to be cruising condition. In the aforesaid embodiment, the external sensor group 31 (RADAR, LIDAR, camera and the like) is adapted to detect obstacles, but an obstacle detector is not limited to this configuration. In the aforesaid embodiment, the action plan generation unit 45 determines whether obstacle avoidance action is necessary, but an avoidance action determination unit is not limited to this configuration.

In the above configuration, an example that the engine 1 and transmission 2 are controlled owing to instruction of switching of drive mode during acceleration, is explained. However, the present invention can be also similarly used when other equipment (for example, travel motor or clutch) for driving a vehicle is controlled.

The present invention can also be used as a vehicle travel control method configured to control an actuator for driving a vehicle.

The above embodiment can be combined as desired with one or more of the above modifications. The modifications can also be combined with one another.

According to the present invention, it is possible to switch to a self-drive mode without providing odd sensation to passengers even when switching to self-drive mode is instructed during acceleration in manual drive mode.

Above, while the present invention has been described with reference to the preferred embodiments thereof, it will be understood, by those skilled in the art, that various changes and modifications may be made thereto without departing from the scope of the appended claims.

What is claimed is:

1. A vehicle travel control apparatus configured to control an actuator for driving a vehicle, comprising:
   a drive mode instruction switch configured to instruct a manual drive mode or a self-drive mode;
   a vehicle speed detector configured to detect a vehicle speed; and
   an electric control unit having a microprocessor and a memory, wherein
   the microprocessor is configured to perform:
   generating an action plan in the self-drive mode;
   determining whether a deviation between the vehicle speed detected by the vehicle speed detector and a target vehicle speed included in the action plan generated in the generating is equal to or less than a predetermined value;
   switching a drive mode in accordance with an instruction of the drive mode instruction switch;
   controlling the actuator in the self-drive mode in accordance with the action plan generated in the generating;
   the switching including switching from the manual drive mode to the self-drive mode, when switching from the manual drive mode to the self-drive mode is instructed by the drive mode instruction switch during an acceleration running or deceleration running in the manual drive mode; and
   the controlling including controlling the actuator so as to maintain an acceleration in the manual drive mode at least until it is determined in the determining that the deviation is equal to or less than the predetermined value, when the switching from the manual drive mode to the self-drive mode is instructed by the drive mode instruction switch during the acceleration running or deceleration running in the manual drive mode.

2. The apparatus according to claim 1, wherein
the actuator includes a shift actuator configured to drive a transmission in accordance with a first characteristic curve for the self-drive mode or a second characteristic curve for the manual drive mode, and
the microprocessor is configured to perform
when the switching from the manual drive mode to the self-drive mode is instructed by the drive mode instruction switch during the acceleration running or deceleration running in the manual drive mode, the controlling including controlling the shift actuator in accordance with the second characteristic curve at least until it is determined in the determining that the deviation is equal to or less than the predetermined value, while controlling the shift actuator in accordance with the first characteristic curve after it is determined in the determining that the deviation is equal to or less than the predetermined value.

3. The apparatus according to claim 2, wherein
the microprocessor is configured to perform
when the switching from the manual drive mode to the self-drive mode is instructed by the drive mode instruction switch during the acceleration running or deceleration running in the manual drive mode, the controlling including controlling the shift actuator in accordance with the second characteristic curve until a condition that the deviation is equal to or less than the predetermined value continues for a predetermined time, while controlling the shift actuator in accordance with the first characteristic curve after the condition continues for the predetermined time.

4. The apparatus according to claim 2, wherein
the microprocessor is configured to perform
when the switching from the manual drive mode to the self-drive mode is instructed by the drive mode instruction switch during the acceleration running or deceleration running in the manual drive mode, the controlling including controlling the actuator so as to maintain the acceleration in the manual drive mode immediately before switching to the self-drive mode until it is determined in the determining that the deviation is equal to or less than the predetermined value, while controlling the actuator so as to reduce the acceleration after it is determined in the determining that the deviation is equal to or less than the predetermined value.

5. The apparatus according to claim 4, wherein
the predetermined value is a first predetermined value less than a second predetermined value, and
the microprocessor is configured to perform
after the switching from the manual drive mode to the self-drive mode is instructed by the drive mode instruction switch during the acceleration running or deceleration running in the manual drive mode, the controlling including controlling the actuator so as to gradually reduce the acceleration until it is determined that the deviation is equal to or less than the second predetermined value, while controlling the actuator so as to maintain the acceleration at 0 after it is determined that the deviation is equal to or less than the second predetermined value.

6. The apparatus according to claim 2, further comprising an obstacle detector configured to detect an obstacle, wherein
the microprocessor is configured to perform:
determining whether it is determined that an avoidance action for avoiding the obstacle detected by the obstacle detector during running in the self-drive mode is necessary; and
in a state that the shift actuator is controlled in accordance with the second characteristic curve by switching from the manual drive mode to the self-drive mode after the switching from the manual drive mode to the self-drive mode is instructed by the drive mode instruction switch during the acceleration running or deceleration running in the manual drive mode, the controlling including controlling the shift actuator in accordance with the first characteristic curve when it is determined in the determining that the avoidance action is necessary.

7. The apparatus according to claim 2, wherein
when the switching from the self-drive mode to the manual drive mode is instructed by the drive mode instruction switch during the acceleration running or deceleration running in the self-drive mode, the microprocessor is configured to perform
the controlling including controlling the shift actuator in accordance with the second characteristic curve, and
the switching including prohibiting switching to the manual drive mode until it is determined that the deviation is equal to or less than the predetermined value.

8. A vehicle travel control method configured to control an actuator for driving a vehicle, comprising:
instructing a manual drive mode or a self-drive mode;
detecting a vehicle speed;
generating an action plan in the self-drive mode;
determining whether a deviation between the vehicle speed detected in the detecting and a target vehicle speed included in the action plan is equal to or less than a predetermined value;
switching a drive mode in accordance with an instruction in the instructing; and
controlling the actuator in the self-drive mode in accordance with the action plan generated in the generating, wherein
the switching includes switching from the manual drive mode to the self-drive mode, when switching from the manual drive mode to the self-drive mode is instructed in the instructing during an acceleration running or deceleration running in the manual drive mode, and
the controlling includes controlling the actuator so as to maintain an acceleration in the manual drive mode at least until it is determined in the determining that the deviation is equal to or less than the predetermined value, when the switching from the manual drive mode to the self-drive mode is instructed in the instructing during the acceleration running or deceleration running in the manual drive mode.

9. The method according to claim 8, wherein
the actuator includes a shift actuator configured to drive a transmission in accordance with a first characteristic curve for the self-drive mode or a second characteristic curve for the manual drive mode, and
the controlling includes, when the switching from the manual drive mode to the self-drive mode is instructed during the acceleration running or deceleration running in the manual drive mode, controlling the shift actuator in accordance with the second characteristic curve at least until it is determined in the determining that the deviation is equal to or less than the predetermined value, while controlling the shift actuator in accordance with the first characteristic curve after it is determined in the determining that the deviation is equal to or less than the predetermined value.

10. The method according to claim 9, wherein
the controlling includes, when the switching from the manual drive mode to the self-drive mode is instructed during the acceleration running or deceleration running in the manual drive mode, controlling the shift actuator in accordance with the second characteristic curve until a condition that the deviation is equal to or less than the predetermined value continues for a predetermined time, while controlling the shift actuator in accordance with the first characteristic curve after the condition continues for the predetermined time.

11. The method according to claim 9, wherein
the controlling includes, when the switching from the manual drive mode to the self-drive mode is instructed during the acceleration running or deceleration running in the manual drive mode, controlling the actuator so as to maintain the acceleration in the manual drive mode immediately before switching to the self-drive mode until it is determined in the determining that the deviation is equal to or less than the predetermined value, while controlling the actuator so as to reduce the acceleration after it is determined in the determining that the deviation is equal to or less than the predetermined value.

12. The method according to claim 11, wherein
the predetermined value is a first predetermined value less than a second predetermined value, and
the controlling includes, after the switching from the manual drive mode to the self-drive mode is instructed during the acceleration running or deceleration running in the manual drive mode, controlling the actuator so as to gradually reduce the acceleration until it is determined that the deviation is equal to or less than the second predetermined value, while controlling the actuator so as to maintain the acceleration at 0 after it is determined that the deviation is equal to or less than the second predetermined value.

13. The method according to claim 9, further comprising:
detecting an obstacle; and
determining whether it is determined that an avoidance action for avoiding the obstacle detected in the detecting during running in the self-drive mode is necessary; wherein
the controlling includes controlling the shift actuator in accordance with the first characteristic curve when it is determined in the determining that the avoidance action is necessary, in a state that the shift actuator is controlled in accordance with the second characteristic curve by switching from the manual drive mode to the self-drive mode after the switching from the manual drive mode to the self-drive mode is instructed during the acceleration running or deceleration running in the manual drive mode.

14. The method according to claim 9, wherein
the controlling includes controlling the shift actuator in accordance with the second characteristic curve, when the switching from the self-drive mode to the manual drive mode is instructed during the acceleration running or deceleration running in the self-drive mode, and
the switching includes prohibiting switching to the manual drive mode until it is determined that the deviation is equal to or less than the predetermined value.

* * * * *